United States Patent [19]

Crepaldi

[11] Patent Number: 4,664,438
[45] Date of Patent: May 12, 1987

[54] DEFORMABLE BERTH FOR VEHICLE CABS

[75] Inventor: Giulio Crepaldi, Novara, Italy

[73] Assignee: Aluminia S.p.A., Portoscuso, Italy

[21] Appl. No.: 752,145

[22] Filed: Jul. 3, 1985

[30] Foreign Application Priority Data

Jul. 18, 1984 [IT]  Italy ............................. 22619/84[U]

[51] Int. Cl.⁴ ............................................. B62D 33/06
[52] U.S. Cl. .................................... 296/190; 296/189;
 296/65 A; 5/9 R; 5/118; 5/400; 428/118;
 108/51.1; 105/319; 105/321
[58] Field of Search ...................... 296/189, 190, 65 A;
 5/9 R, 9 B, 10 R, 118, DIG. 1, 400; 428/116,
 118; 105/319, 321; 297/216, 450; 108/51.1, 3

[56] References Cited

U.S. PATENT DOCUMENTS

| | | | |
|---|---|---|---|
| 1,477,110 | 12/1923 | Cross ......................................... | 5/118 |
| 3,588,168 | 6/1971 | Froitzheim et al. ................ | 296/190 |
| 3,709,161 | 1/1973 | Kauffman ........................... | 108/51.1 |
| 3,744,835 | 7/1973 | Carbone et al. .................... | 428/116 |
| 3,750,598 | 8/1973 | Campbell et al. .................. | 108/51.1 |
| 3,772,716 | 11/1973 | Ratcliff ................................ | 5/10 R |
| 4,344,995 | 8/1982 | Hammer ............................. | 428/116 |

FOREIGN PATENT DOCUMENTS

| | | |
|---|---|---|
| 2548137 | 2/1977 | Fed. Rep. of Germany . |
| 2547630 | 4/1977 | Fed. Rep. of Germany ...... 296/190 |
| 1407121 | 6/1965 | France . |
| 2010236 | 2/1970 | France . |
| 2242264 | 3/1975 | France . |
| 1037730 | 8/1966 | United Kingdom ................ 296/190 |

Primary Examiner—Robert B. Reeves
Assistant Examiner—Dennis H. Pedder
Attorney, Agent, or Firm—Collard, Roe & Galgano

[57] ABSTRACT

A berth or bunk for cabs of industrial vehicles and the like, positioned behind the driver's and passenger's seats. The bunk is so structured as to be easily deformed in case of a road accident by the thrust created by the rearward motion of the seats, when a device for automatic or manually-controlled rearward motion of the seats is activated, to contribute to the safety of the driver and the passenger.

4 Claims, 3 Drawing Figures

U.S. Patent    May 12, 1987    4,664,438
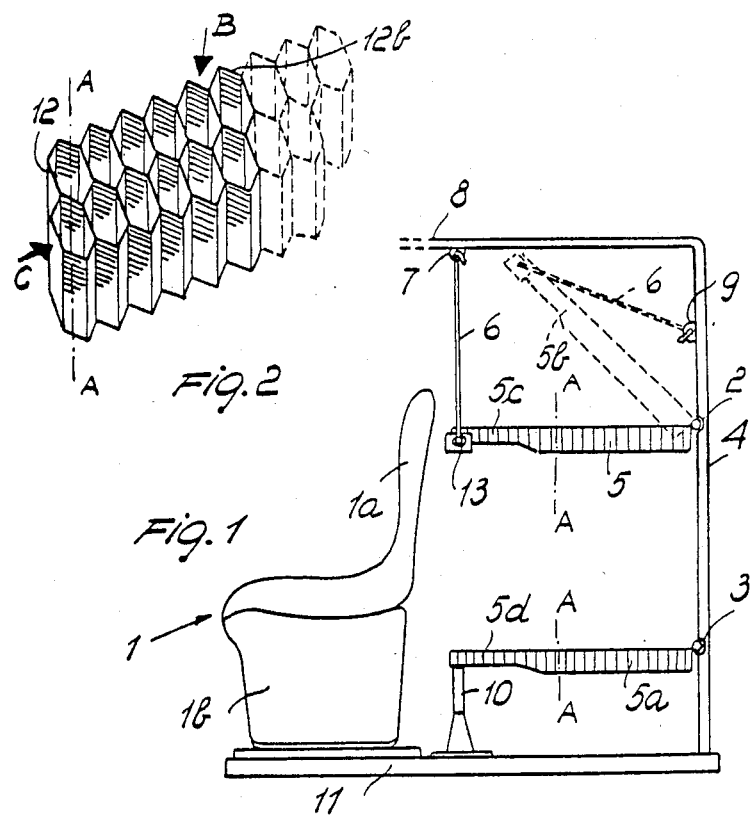
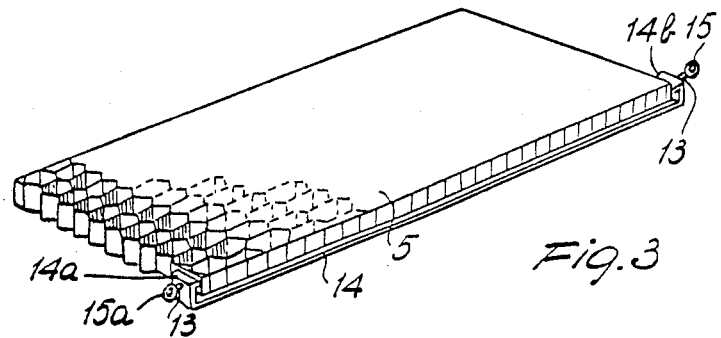

DEFORMABLE BERTH FOR VEHICLE CABS

The object of the present invention is a berth or bunk for cabs of industrial vehicles and the like, normally positioned behind the seats, which are positioned side to side of each other, for the driver and for the second driver. The berth is structured as to be easily deformable, in case of a road accident, under the thrust created by the motion backwards of the seats towards the rear wall of the cab, in the cases in which to the seats a device is applied for the automatic back-moving, for contributing to the safety of the driver and passenger.

It is known that the berths present in the cabs of industrial vehicles are constituted by rigid structures, hinged on to the rear wall of the cab, and liftable upwards. Normally, two of such berths are envisaged, as superimposed to each other, the lower one resting, at the opposite side relative to the hinged side, on a support which is rigidly fastened onto the floor. The upper berth is supported in its open position by a belt or chain, which serves also to hold the same berth in the lifted position, after its rotation around its hinging side.

It is also well known that, in case of a front impact of the vehicle, if a seat protection device, with either automatic or manual control, is provided to cause the same seat to quickly move rearwards for the purpose of reducing injuries to the driver, the presence of the berths with rigid structure prevents the backward displacement of the seat, defeating the effect of the protection device.

The purpose of the present invention is hence to provide a berth having a deformable structure, capable of allowing a very high reduction in the volume thereof in the direction of the rearward motion of the seat, without impairing the functionality, practicality and mechanical flexural strength of the berth.

Another purpose of the invention is to provide a berth having a deformable structure particularly, but not exclusively, suitable to be used in association with safety devices for the drivers of industrial motor-vehicles of traditional types providing back-moving devices of the seat, or of the type described in co-pending Italian application No. 21710 A/84, filed July 2, 1984.

A further purpose of the invention is to provide a berth having such a structure, as to be suitable to be easily applied, as a replacement of the rigid ones, without requiring any modifications of the supports and/or of the hinging devices already existing in the cabs.

Still a further purpose is to provide a type of berth of very low weight, of low cost, and capable of advantageously reducing the tare weight of the vehicle thus favoring an increase of the useful transportable load.

These and still other purposes, which shall be better evidenced from the following disclosure, are advantageously achieved by a berth or bunk of industrial vehicles and the like of traditional shape and size, and of the type hinged onto the rear wall of the same cab. The berth is constituted, according to the present invention, by a single board made of deformable material, and more precisely by a honeycomb structure, or the like, of metal, such as aluminum or its alloys, or of other suitable material. The cells, which are of substantially tubular shape, are positioned with their longitudinal central axis as directed perpendicularly to the plane of the berth-forming board, so as to display a very high flexural strength, so that it may support the weight of one person. The board has a very high deformability in the direction perpendicular to the axis of the cells, so as to allow the seat to move backwards, at the moment of vehicle's impact, when the same seat is provided with a back-moving device with either automatic or manual control.

More particularly, said berth with deformable structure is preferably made with a cross section of smaller area in the first length thereof starting from the seat, and with a greater and constant area of the cross section in the remaining portion thereof. This provides the seat with a diversified deformability, and namely greater at the starting moment of the seat backward motion, and of the consequent contact thereof with the board.

Further structural and functional characteristics of the berth being the object of the present invention shall be evidenced in greater detail by the following disclosure, made with reference to the attached drawing table, which is given to purely indicative and not limitative purposes, wherein:

FIG. 1 shows, in a schematic arrangement, a side view of two superimposed berths, accomplished according to the present invention, and positioned inside a driving cab of an industrial vehicle;

FIG. 2 shows, in a perspective view, a cellular structure used for the accomplishing of the berth being the object of the present invention, without any coatings of fabric or the like, and FIG. 3 shows, in a persepctive view, a type of bar-shaped reinforcing element for the deformable board as shown in the above figures.

Referring to such figures, the berth having the structure according to the present invention is applied, as superimposed to another one, within a driving cap of an industrial vehicle, rearwards relatively to the adjustable driving seat 1 and hinged, as in the known types, in 2, and, respectively, in 3, onto the vertical rear wall 4 of the same cab.

The upper berth 5 is supported, at the opposite side relative to the hinging side, by a belt 6 which can be anchored to an eye hook 7 fastened to the ceiling 8 of the cab. Belt 6 also allows berth 5 to be held in the lifted position, as shown with 5b in dotted lines, when it is anchored to the side hook 9, fastened to the wall 4 of the cabin.

The lower berth 5a is on the contrary kept substantially horizontal by its free end being resting on a support 10 fixed to the floor 11.

According to the present invention, each one of the berths 5 and 5a is constituted by a single board of material deformable in one direction only, and precisely by a cellular structure (FIG. 2) of the honeycomb type and the like. Said structure is substantially constituted by a plurality of adjacent tubular cells 12, 12a, 12b and so forth, preferably having the shape of hollow tubular bodies of hexagonal, octagonal, ellipsoidal, circular, or the like, cross section, whose longitudinal axis is positioned perpendicularly to the plane of the board, as indicated by the lines A—A shown on the boards 5—5a forming the berth (FIGS. 1 and 2).

This particular arrangement of the axis of the cells 12, 12a and so on, allows it to take advantage in the practice of the high flexural strength of the said cellular board when said cellular board is stressed in the direction as shown by arrow B (FIG. 2). This arrangement also allows the board to take advantage at the same time of its high deformability, when the board is submitted to a stress as directed according to arrow C.

As is known, honeycomb structures are produced by expanding a block composed of several metallic strips (or foils, subsequently to be cut) bonded one to the other by parallel staggered lines. Such high and easy deformability is due to the fact that the deformation takes place according to a direction opposite to the direction of the expansion when the structure is produced, so that the structure itself, under the stress, tends toward the compactness of the initial block, before the expansion, like a bellows.

The particular characteristics of this cellular structure have demonstrated to be particularly suitable to the purpose of accomplishing berths for driving cabs whose front seats are provided with either an automatic or manually-controlled devices for back-moving or rearward motion of the seat in case of front impact of the vehicle, for the purpose of reducing injuries to the driver under such circumstances.

In fact, in case of the shift backwards of the seat 1, the seat back 1a deforms the upper berth 5 and the seat 1b deforms the lower berth 5a, reducing the volume of the boards forming the berths themselves to a considerable extent, and in a gradual way.

In order then to increase the gradualness of deformation of the berths, the front portion 5c, and respectively 5d of the same berths is made lower in thickness than the residual portion of the board. When the seat starts moving backwards, the seat back deforms quickly the portion 5c and the seat, soon after, deforms zone 5d equally quickly while, on the seat continuing to move backwards, the greater thickness of the board advantageously reduces the deformation speed of the same berths.

Moreover, for the purpose of allowing a safe fastening of the belts or chains 6 to the points 13 of the upper berth 5, the board is reinforced by flanges 14 and hooks or eyes are provided, for the fastening of the belts 6. If necessary, the ends of the berths may be reinforced by means of slabs or other suitable metal elements also in correspondence of the hinging zones 2 and 3.

Of course, to the particular practical embodiment of the invention, as hereinabove disclosed according to an indicative and not limitative form thereof, changes may be made to the dimensions and the shape of the board. Also, the type of cellular structure deformable in one direction only, may also be modified always within the protection field of the same invention.

I claim:

1. A berth of the type hinged onto the rear wall of a cab of a vehicle equipped with a safety apparatus for moving the vehicle seat rearwardly in the event of a front end collision comprising:

a planar board having a metal honeycomb-like structure including a plurality of cells of substantially tubular shape positioned with their central longitudinal axis perpendicular to the plane of said board, such that said board has high flexural strength for supporting the weight of a person thereon, and high deformability in the direction perpendicular to said central longitudinal axis of said cells, thereby allowing a seat in the cab, moving rearwardly as a result of a front end collision, to easily deform said board without encountering substantial crushing resistance from said berth, said board having a main section and an initial section having a cross-sectional area less than that of said main section, said initial section thereby having a structure more easily deformable than said main section, said initial section being integral with said main section and disposed adjacent to the seat, said board thereby exhibiting a decreasing deformability under impact by a rearwardly moving seat.

2. The berth according to claim 1, wherein said metal is aluminum.

3. The berth according to claim 1, wherein said metal is aluminum alloy.

4. The berth according to claim 1, wherein said cells are hexagonally shaped and arranged so that two sides thereof are perpendicular to the rearward movement of said seat.

* * * * *